United States Patent [19]

McLaughlin

[11] 4,333,243

[45] Jun. 8, 1982

[54] LATITUDE FINDER

[76] Inventor: Harry P. McLaughlin, 4431 - 25th SW., Seattle, Wash. 98166

[21] Appl. No.: 195,844

[22] Filed: Oct. 10, 1980

[51] Int. Cl.³ ............................................. G01C 21/20
[52] U.S. Cl. ...................................... 33/268; 33/270; 33/283
[58] Field of Search ............ 33/268, 283, 282, 275 R, 33/273, 272, 269, 270, 271, 274

[56] References Cited

U.S. PATENT DOCUMENTS

| | | | |
|---|---|---|---|
| 396,883 | 1/1889 | Lawrence | 33/283 |
| 849,841 | 4/1907 | Goode | 33/270 |
| 972,889 | 10/1910 | McCallister | 33/268 |
| 1,034,767 | 8/1912 | Cheifetz | 33/271 |
| 2,094,833 | 10/1937 | McAuliffe | 33/270 |
| 2,412,831 | 12/1946 | Owens | 33/283 |
| 3,947,973 | 4/1976 | Dunn | 33/270 X |

FOREIGN PATENT DOCUMENTS 960 of 1884 United Kingdom ................. 33/283

*Primary Examiner*—William D. Martin, Jr.
*Attorney, Agent, or Firm*—Graybeal & Uhlir

[57] ABSTRACT

An apparatus for indicating the latitude position of the user is disclosed. The apparatus comprises a base member carrying a scale having degrees of latitude marked on the scale. The base member further carries a scale correcting for the declination of the sun north or south of the equator during days of the year. A vertical member extends perpendicularly upwardly from the base member and carries a means alignable with the current day date when the base member is oriented in a meridian plane and rotated in a vertical plane. When the base member is oriented in a north-south direction and the means aligned to the current date, the end of the shadow cast by the vertical member on the scale of degrees of latitude indicates the latitude position of the user.

5 Claims, 5 Drawing Figures

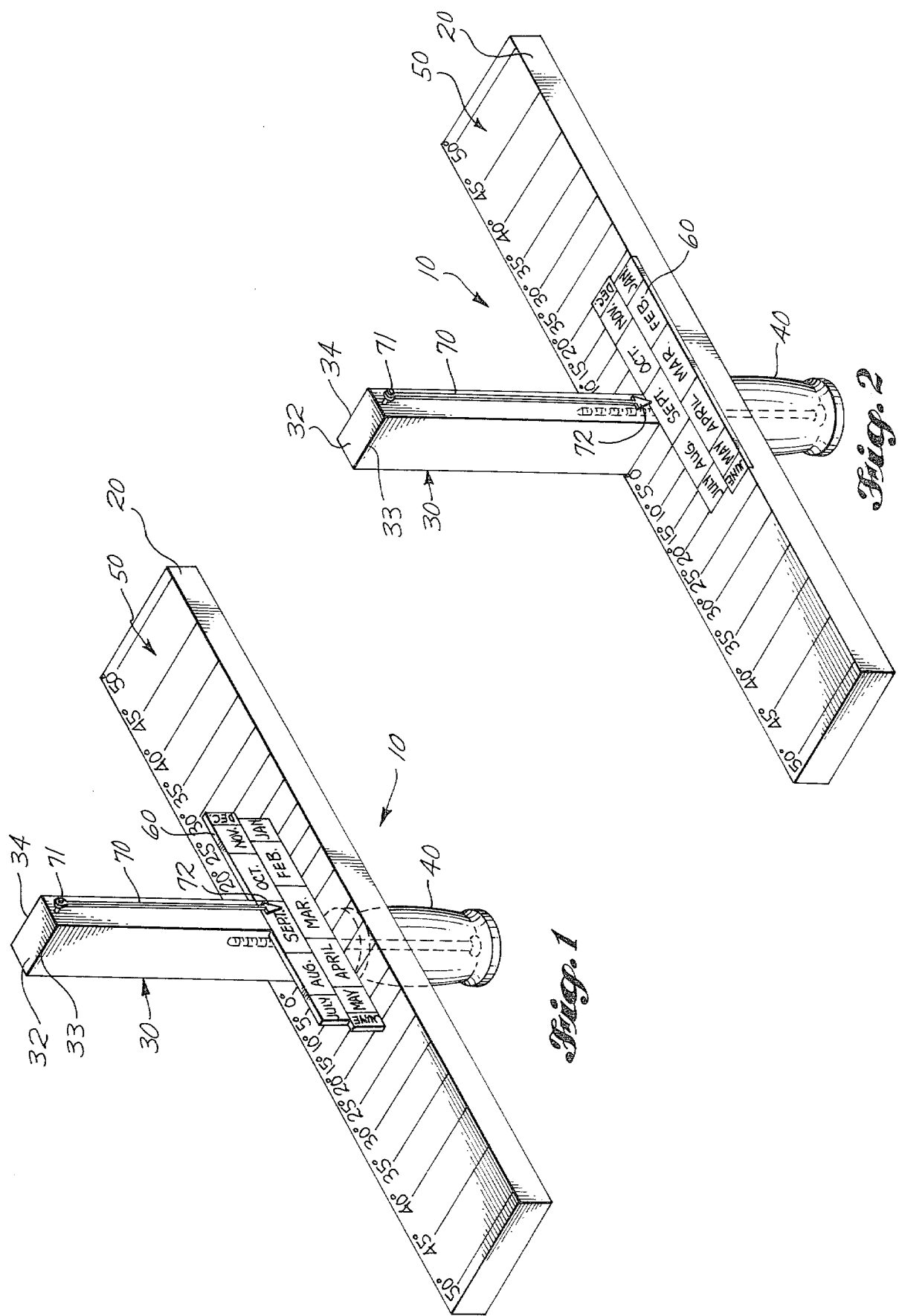

4,333,243

LATITUDE FINDER

TECHNICAL FIELD OF INVENTION

This invention relates to navigation instruments, and more particularly to an instrument for indicating the latitude position of the user.

BACKGROUND ART

Navigation instruments used to determine the latitude position of surface vessels such as ships or the like are old in the art. One such instrument is shown by McCallister, U.S. Pat. No. 938,780. The instrument disclosed includes a base upon which are disposed a pair of scales. One scale denotes the degrees of latitude, while the other scale is divided into the number of days included between the longest day of the year and the shortest day of the year. An arm is perpendicular to the base and moveably positioned within a slot at one end of the base along the length of the scale containing the number of days of the year. By orienting the base in a north-south direction, and by moving the arm opposite a position on the scale designating the day on which the reading is taken, the end of the shadow cast by the arm on the scale having the degrees of latitude indicates the latitude position of the surface vessel. The disclosed instrument corrects for the declination of the sun by movement of an arm which is perpendicular to the base. The instrument therefore requires placement of the base on a stationary planer surface of the vessel located in a meridian plane before the latitude of the vessel can be determined. In the absence of such a planar surface, the accuracy of any subsequent latitude reading is questionable.

Instruments disclosed in the prior art used to aid navigation employ various means which cast shadows to determine the altitude of a celestial body such as the sun or the like. Typical instruments are shown in Hewitt, U.S. Pat. No. 728,915, and France, U.S. Pat. No. 2,904,889. In general, the disclosed devices must be placed on a stationary horizontal planer surface in order to accurately determine the height of the celestial body. The points at which the shadows cast by the vertical member of the disclosed instruments intersect reference scales are used in complicated trigonometric formulas, the solutions of which are needed to accurately determine the height of the celestial body.

The present invention overcomes the problems and limitations of the nautical and navigational instruments disclosed in the prior art. The disclosed invention does not require placement on a planar surface of the vessel to determine the latitude of the vessel for the reason that the invention corrects for the declination of the sun by use of a pendulum disposed on a vertical member of the instrument. The pendulum is aligned with the day the reading is taken by manually orienting the invention in the noon day sun until one end of the pendulum points to the current day date. The shadow cast by the vertical member when the pendulum has been so aligned impinges upon a scale having latitude markings. By noting the point at which the shadow strikes the scale, the latitude of the vessel is directly determined without the use of trigonometric formulas and time consuming, complex calculations.

DISCLOSURE OF THE INVENTION

One aspect of the present invention is to provide an apparatus indicating the latitude position of the user. The apparatus comprises a base member carrying a scale having the degrees of latitude marked on the scale. The base member further carries a scale having a correction for the declination of the sun north or south of the equator during each day of the year. The apparatus includes a vertical member extending perpendicularly upwardly from the base member. The vertical member includes means which are alignable with the current day date when the base member is oriented in a meridian plane in a north-south direction and rotated in the vertical plane. When the means are aligned to the current day date, the end of the shadow cast by the vertical member on the scale having the degrees of latitude marked thereon indicates the latitude position of the user of the apparatus.

Another aspect of the present invention is to provide a method for determining latitude position. The method comprises the steps of positioning an elongate scale having degrees of latitude marked thereon in a meridian plane in the noon day sun such that one end of the elongate scale points north and the other end of the elongate scale points south. The elongate scale is rotated in the vertical plane such that means carried on a vertical member attached to the elongate scale is aligned with the current day date on a scale carried by the elongate scale correcting for the declination of the sun north or south of the equator during each day of the year. By reading the latitude position from the scale having the degrees of latitude marked thereon at the point at which the end of the shadow cast by the vertical member impinges upon the scale, the latitude position is accurately determined.

It is an object of the present invention to provide an apparatus indicating the latitude position of a user by using the rays of the sun.

A further object of the present invention is to provide an apparatus which easily and accurately determines the latitude position of a user.

A still further object of the present invention is to provide an apparatus which is simple in construction enabling the apparatus to be manufactured economically.

A still further object of the present invention is to provide an apparatus having component members which can be disassembled enabling the apparatus to be stored easily.

The foregoing, and other objects, features, and advantages of the present invention will become more apparent in light of the detailed description of the preferred embodiments thereof set forth hereafter, and illustrated in the accompanying drawings.

BRIEF DESCRIPTION OF THE DRAWINGS

FIG. 1 is a perspective view of one embodiment of the present invention showing a typical location of the scale correcting for the declination of the sun.

FIG. 2 is a perspective view of another embodiment of the present invention showing another location of the scale correcting for the declination of the sun.

BEST MODE OF CARRYING OUT THE INVENTION

Figure 3:
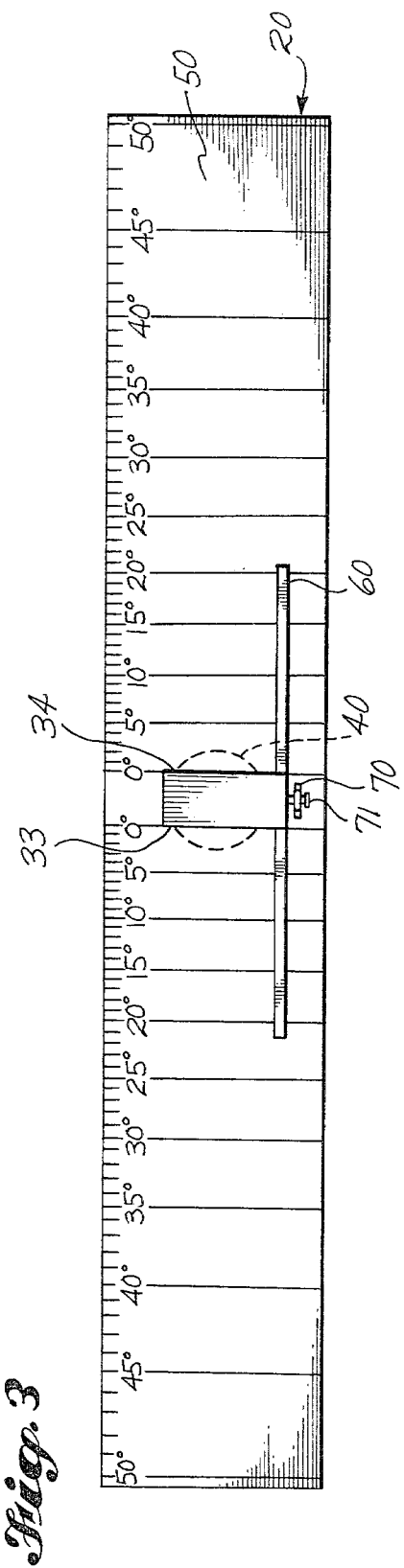
FIG. 3 is a top view of the typical embodiment of the present invention shown in FIG. 1.
Figure 4:
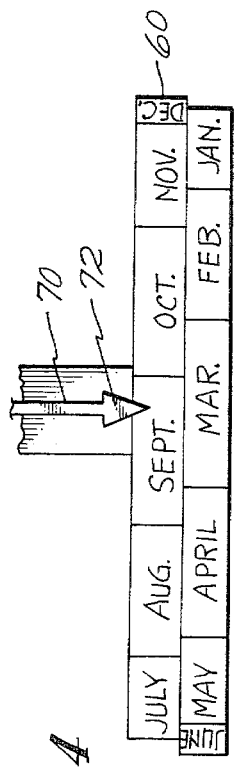
FIG. 4 is an enlarged view of a typical scale correcting for the declination of the sun north or south of the equator.
Figure 5:
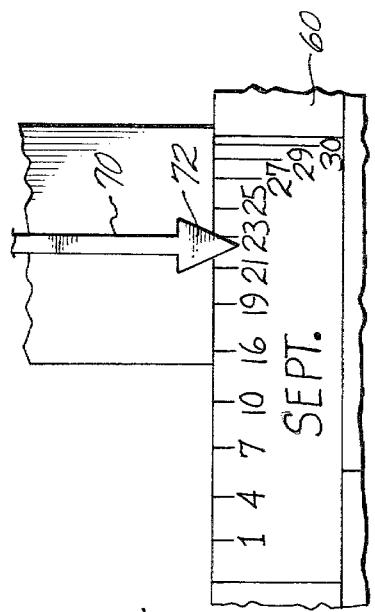
FIG. 5 is an enlarged view of the typical scale shown in FIG. 4.

With reference to FIGS. 1, 2, a typical apparatus for indicating the latitude position of a user is shown at 10. The apparatus comprises an elongate base member 20 with a vertical member 30 extending perpendicularly upwardly from the base member. A handle 40 is removably attached to the base member and secures the vertical member rigidly to the base member. The base member carries a scale shown at 50 which has degrees of latitude marked thereon. A second scale, shown generally at 60 corrects for the declination of the sun north or south of the equator for the days of the year. The vertical member carries a means 70 alignable with the scale 60 when the base member is rotated in the vertical plane such that when the end of the shadow cast by the vertical member impinges upon scale 50, the end of the shadow indicates the latitude position of the user. Each of the aforementioned members, and the operation of the present invention will next be described in more detail.

As best shown in FIGS. 1, 2 and 3, the scale 50 indicates an increase in degree of latitude as the scale extends outwardly along the length of the elongate base on either side of the vertical member. In this manner, the present invention allows the user to obtain his latitude position either north or south of the equator by facing either east or west when the reading is being made. For illustrative purposes only, the scale has been shown as including the fiftieth degree of latitude. It is to be understood, however, that the scale may include greater degrees of latitude without departing from the teachings of the present invention. With reference to FIG. 3, the scale is shown with four latitude markings between each fifth latitude marking. This configuration of the markings enables the latitude of the user to be determined accurately to the nearest degree. Higher accuracies are possible by interpretation as will be described below. In the preferred embodiment, the elongate base member is typically twelve inches in overall length and extends approximately six inches on either side of the vertical member. The elongate base is typically constructed from wood with the scale markings being typically formed on a decal or the like which may be affixed to the base member accordingly.

With reference to FIGS. 1-4, a second scale 60 is carried on the elongate base member and includes markings which divide the scale into the months and days of the year. As will be described below, the scale in conjunction with the means 70 carried by the vertical member corrects for the declination of the sun north or south of the equator during the day the latitude reading is taken. The scale is positioned with respect to means 70 such that the means indicates the approximate days of the year at the equator when the declination of the sun is zero (i.e. the dates of September twenty-first and March twenty-first), when the elongate base is held in a horizontal plane. The scale is also positioned with respect to means 70 such that six months of the calendar year extend outwardly along the elongate base on one side of the vertical member while the remaining six months of the calendar year extend outwardly along the base on the other side of the vertical member. In this manner the user can determine his latitude position north or south of the equator while facing either the east or west directions. In the preferred embodiment, the scale is made from wood or the like, extends upwardly from the elongate base and is rigidly supported on the elongate base by the vertical member. The markings are typically affixed to the scale by decals or the like. In the embodiment as shown in FIG. 2, the scale is integral with the scale having degrees of latitude marked thereon.

A vertical member 30 extends perpendicularly upwardly from the elongate member and is terminated with a substantially flat top 32 having substantially sharp sides 33, 34 thereon. As can be seen in FIG. 3, the sides 33, 34 are coincident with the markings on the scale 50 corresponding to zero degrees of latitude, that is, the equator, thereby enabling the present invention to provide accurate latitude readings near the equator. The vertical member carries a means 70 such as a pendulum or the like. The pendulum is attached to the vertical member at one end by means 71 which are old per se enabling the pendulum to rotate freely with respect to the vertical member as will be described. The other end of the pendulum includes a pointer 72 alignable with the day and month during which the latitude reading is made when the elongate base member is rotated. The vertical member typically is constructed from wood or the like and extends approximately five inches above the elongate base. In the preferred embodiment the vertical member is removably attached to the base member by handle 40. The handle includes means which are old per se, such as a screw or the like, extending through the elongate base to engage and secure the vertical member thereto. It can be seen that when the handle is removed from the elongate base, the vertical member is removable from the elongate base member enabling the present invention to be easily stored when not in use.

The operation of the present invention will next be described. By grasping the handle, the user first orients the present invention in a meridian plane in the noon day sun. The user thereafter orients the elongate base member such that one end of the scale having latitude markings thereon is oriented to the north, while the other end of the scale is oriented to the south. To correct for the declination of the sun north or south of the equator during the day of use, the present invention is rotated in a vertical plane until the pendulum pointer points to the date corresponding to the current day date. When the sun's rays impinge upon the vertical member, the substantially sharp sides on either side of the top of the vertical member cast a shadow on the scale having latitude markings thereon. The point at which the end of the shadow strikes the scale corresponds to the latitude position of the user.

It is obvious to those skilled in the art that other modifications to the present invention can be made without departing from the teachings of the present invention. For example, the vertical member can be located at one end of the elongate base member thereby enabling latitude readings north or south of the equator by orienting the user either in the east or west direction as the reading is made. Additionally, the vertical member may be removably attached to the elongate base member by means such as a screw or the like, extending through the base member. The handle then may extend outwardly from the base member enabling the user to freely rotate the elongate base member in the vertical plane to correct for the declination of the sun north or south of the equator.

I claim:

1. An apparatus for indicating the latitude position of the user comprising:
   (a) a planar base member having both a scale having degrees and a scale having the days of the year marked on its top surface;
   (b) a vertical member extending perpendicularly upwardly from the base member; and,
   (c) pendulum means carried on the vertical member alignable with the current day date when the planar base member is oriented in a meridian plane in a north-south direction and rotated in the vertical plane such that when the pendulum means is so aligned, the end of the shadow on the scale having degrees marked thereon cast by the vertical member from the noon sun indicates the latitude position of the user.

2. The apparatus of claim 1 wherein the vertical member is removably attached to the base member by a handle extending perpendicularly downwardly from the base member plane.

3. The apparatus of claim 1 wherein the scale having degrees marked thereon indicates an increase on both sides of the vertical member.

4. The apparatus of claim 1 wherein the scale having the days of the year marked thereon is integral with the scale having the degrees of latitude marked thereon.

5. The apparatus of claim 1 wherein the scale having the days of the year marked thereon extends vertically upwardly from the base member and is supportably attached to the vertical member.

* * * * *

UNITED STATES PATENT OFFICE
CERTIFICATE OF CORRECTION

Patent No. 4,333,243                    Dated June 8, 1982

Inventor(s)  Harry P. McLaughlin

It is certified that error appears in the above-identified patent and that said Letters Patent are hereby corrected as shown below:

Column 6, line 6, claim 2, after member "plane" has been deleted and

-- said handle including connecting means extending upwardly through the base member to interconnect with said vertical member -- has been inserted.

Signed and Sealed this

Thirtieth Day of November 1982

[SEAL]

Attest:

GERALD J. MOSSINGHOFF

Attesting Officer     Commissioner of Patents and Trademarks